United States Patent [19]

Feher

[11] Patent Number: 5,098,289

[45] Date of Patent: Mar. 24, 1992

[54] HEAD MODEL FOR REPRESENTING GNATHOLOGICAL RELATIONSHIPS

[76] Inventor: Tibor Feher, Blumenstrasse 9, D-4000 Dusseldorf, Fed. Rep. of Germany

[21] Appl. No.: 733,296

[22] Filed: Jul. 22, 1991

[30] Foreign Application Priority Data

Jul. 28, 1990 [DE] Fed. Rep. of Germany ....... 4023991
Dec. 2, 1990 [DE] Fed. Rep. of Germany ... 9016334[U]

[51] Int. Cl.$^5$ .............................................. A61C 11/00
[52] U.S. Cl. ........................................ 433/57; 433/58; 433/61; 433/64
[58] Field of Search .................. 433/54, 57, 58, 61, 433/63, 65, 64; 434/264

[56] References Cited

U.S. PATENT DOCUMENTS

| 686,613 | 11/1901 | Huberty | 433/58 |
| 698,964 | 4/1902 | Kerr | 433/65 |
| 1,055,894 | 3/1913 | Evans | 433/58 |
| 2,797,483 | 7/1957 | Lisowski | 433/57 |
| 3,048,923 | 8/1962 | Franwick | 433/63 |
| 3,570,127 | 3/1971 | Getz | 433/55 |
| 4,175,325 | 11/1979 | Beckwith | 433/60 |
| 4,781,586 | 11/1988 | Lisec | 433/57 |
| 4,968,256 | 11/1990 | Lang et al. | 424/264 |

FOREIGN PATENT DOCUMENTS 3816007 5/1990 Fed. Rep. of Germany .
3816010 5/1990 Fed. Rep. of Germany .

*Primary Examiner*—John J. Wilson
*Assistant Examiner*—Cindy A. Cherichetti
*Attorney, Agent, or Firm*—Chilton, Alix & Van Kirk

[57] ABSTRACT

A model of the human head having a movable lower jaw is used in the analysis of gnathological relationships. The model receives reproductions of a dental patient's upper and lower dental arches and simulates the functional movements which occur during mastication and, in so doing, permits visual observation of the mandibular joints so that a course of therapy may be chosen.

20 Claims, 4 Drawing Sheets

HEAD MODEL FOR REPRESENTING GNATHOLOGICAL RELATIONSHIPS

BACKGROUND OF THE INVENTION

(1) Field of the Invention

The present invention relates generally to dentistry and particularly to enabling visualization of the spacial relationships of and between the jaws of a patent to facilitate decisions as to a therapeutic treatment. More specifically, this invention is directed to a model of the head which facilitates the diagnosis and subsequent treatment of disturbances resulting from malpositioning of the lower jaw. Accordingly, the general objects of the present invention are to provide novel and improved method and apparatus of such character.

(2) Description of the Prior Art

The faulty positioning of the human lower jaw is known to result in muscular and occlusal disturbances. These muscular and occlusal disturbances, in turn, are known to cause headaches, sleep disturbances, destruction of tooth substance and/or a general impairment of the overall well-being of the affected person.

The most important cause of malpositioning of the lower jaw is malocclusion caused by tooth displacement, faulty contours of crowns and filings or dentures which no longer fit satisfactorily. Minute deviations of the lower jaw from the centric occlusion position may result in jaw displacement and thus in malpositioning of the condyles in the mandibular joint.

From the above brief discussion, it should be obvious that therapeutic repositioning of a patients lower jaw may become a task required of the dental professional. In order to facilitate a decision as to the nature of the treatment required, models are often employed. Thus, models of the head are known in the art and often used by dentists as demonstration aids for consideration of processes of the lower jaw. The previous available models, however, have been characterized by various deficiencies which have impeded their adoption and/or use by many professionals.

SUMMARY OF THE INVENTION

The present invention comprises a model which easily enables visualization of human gnathological relationships. A model in accordance with the invention comprises a replica of a human head which facilitates the consideration and understanding of the processes occurring in the lower jaw of a patient. The present invention is particularly useful in demonstrating the relationship between a malocclusion and the positions of the mandibular condyles and the associated sequelae of pathological changes.

A model in accordance with the present invention comprises a simulated human skill in which typical models of the upper and lower jaw can be situated in various pathological situations. This model permits the functional movements of the human organ of mastication to be duplicated and, in particular, permits movements within the mandibular joint cavity to be visualized during such functional movements. Accordingly, the relationship between a disorder of the mandibular joint and occlusion can be illustrated by the model of the present invention. A particularly unique and desirable feature of the invention is that movements taking place in the joint cavities can be observed from the outside of the model. Accordingly, the model of the present invention is particularly suitable for use as a teaching aide and as a demonstration aide for gnathological examinations.

In a preferred embodiment of the invention, the model comprises a first member which represents a skull and upper jaw and a second member which represents the lower jaw. The model also includes, in both members, receivers for removably supporting replicas, i.e., casts, of upper and lower jaw dental arches. The lower jaw representing member is coupled to the first member by a pair of simulated mandibular joints which establish an articulated connection between the first and second members. The lower jaw is also resiliently biased toward an occlusal position. The simulated mandibular joints include simulated condyles. The simulated mandibular joints each also comprise a cranial joint track arranged on the skull, i.e., the first member. These cranial joint tracks, which cooperate with the simulated condyles are in the form of undulating, concave sliding tracks. Slides, which are constrained by guide grooves to move in a direction which is parallel to the cranial joint tracks, can be brought into frictional engagement with a condyle of the lower jaw. These mandibular joint slides are freely displaceable and include attachments which are visible from the exterior of the model.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and which.

DESCRIPTION OF THE DISCLOSED EMBODIMENTS

Figure 1:
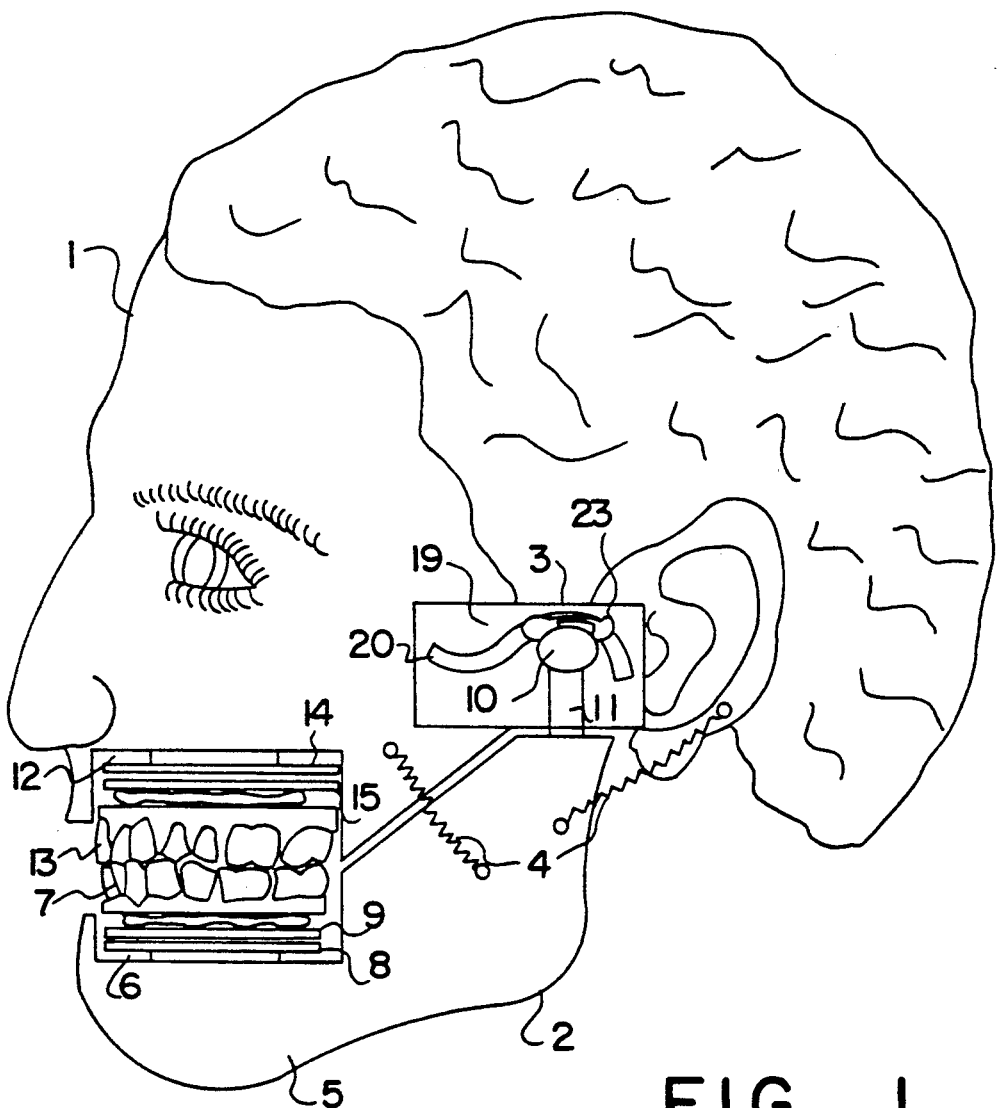
FIG. 1 is a schematic side elevation view of a model in accordance with a first embodiment of the invention.
Figure 2:
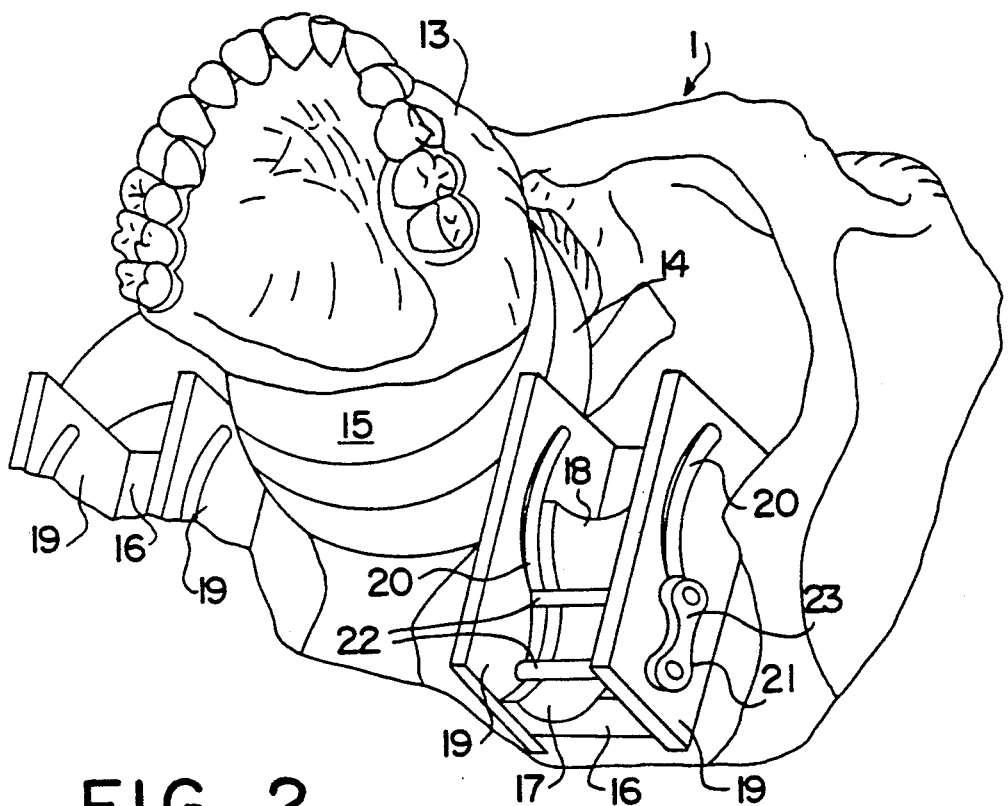
FIG. 2 is a perspective bottom view of the skull portion of the model of FIG. 1, FIG. 2 depicting the upper jaw and the cranial joint truck surfaces of the simulated mandibular joints.

With reference now to the drawings, and particularly to FIGS. 1 and 2, a first embodiment of a three-dimensional model of a human head is generally constituted by a skull member 1 and a lower jaw member 2. The lower jaw member 2 is connected to the skull member 1 by means of a pair of simulated mandibular joints which are indicated generally at 3 on FIG. 1. The lower jaw member 2 is resiliently biased toward the skull member, and thus toward the simulated upper jaw, by elastic attachment devices 4 which simulate the human ligament system and the muscles of the lower jaw. The attachment devices 4, in defining an elastic connection between the skull 1 and lower jaw 2, laterally engage the outside of the lower jaw member 2 on both sides thereof. This elastic connection enables, in response to properly directed force components, the lower jaw 2 to simulate the performance of normal functional jaws movements. These movements comprise an opening movement, protrusive excursion and lateral displacement (left or right). The attachment devices 4 can, moreover, at the same time limit the movement of the lower jaw 2 and, for this purpose, are preferably in the form of springs.

The lower jaw 2 of the model consists of a simulated lower jawbone 5. The geometrical basis for jawbone 5 is Bonwill's triangle. Lower jawbone 5 is provided, adjacent the front thereof, with a recess 6 which exchangeably receives a model 7 of the dental arch of the lower jaw of a patient. Replacement of the dental arch model 7 is facilitated by employing, as the receiver, a "Quicksplit" magnetofix system which includes a primary base 8 anchored in lower jawbone 5. The dental arch model 7 of the patient is fixed in plaster, so as to be anatomically correct for the chosen pathological situation, and is mounted on the secondary base 9 of the magnetofix system.

The articulated connection of the lower jaw 2 to the skull 1 is accomplished by providing a pair of simulated condyles 10 adjacent the rearwardly disposed end of jawbone 5. The simulated condyles 10 form part of the mandibular joints 3 and can be displaced either unilaterally or bilaterally. The outer surface of each of the simulated condyles 10 is preferably of convex shape as shown, i.e., the condyles preferably are in the form of a sphere or are roller-like. The simulated condyles 10, in the disclosed embodiments, are mounted on joint necks 11 and the length of these necks can be individually altered.

The skull member 1 of a model in accordance with the present invention is, in its basic shape, generally a replica of the human head. However, in place of an upper jaw, a recess 12 is provided in the skull. Recess 12 receives a model 13 of the dental arch of the relevant upper jaw of a patient for the selected pathological situation. As in the case of the lower jaw, as discussed above, a "Quicksplit" magnetofix system is provided on the skull. The primary base 14 of this magnetofix receiver system is anchored in the upper jaw region and, in the typical case, is arranged so as to be parallel to the horizontal plane of the skull. The upper jaw model 13 is fixed in plaster, anatomically correctly, and mounted on the secondary base 15 of the magnetofix system.

As may best be seen from FIG. 2, the simulated mandibular joints 3 each define a replaceable cranial joint track 16. The joint tracks 16 are located in the region of the temporal bone of the skull 1. The joint tracks 16 are identically constructed and comprise a slightly undulating cranial joint surface having a concave dorsal section 17 and a convex interior section 18. The cranial joint surface defined by the tracks 16, viewed in cross-section, is preferably complimentary to the shape of the exterior surface of the cooperating condyles 10. Restated, the cranial tracks are, in the disclosed embodiments, concave and have a curvature which enables the condyles 10 to perform both a pivoting and a sliding movement in the mandibular joint 3.

Each cranial joint track 16 is axially limited, on both sides, by side pieces 19. The side pieces 19 are provided with aligned, parallel guide grooves 20 which follow the contour of the cranial joint track 16. The guide grooves 20 associated with each cranial joint track 16 thus define a sliding track for guiding movement which is parallel to the surface contour of the joint track. A slide, indicated generally at 21, is supported so as to be freely movable along a path defined the parallel guide grooves 20. The slide 21 represents a replica of the meniscus (cartilage mass or disk) of the mandibular joint 3. The joint cavity of the mandibular joint 3 is divided by the slide 21, i.e., the meniscus replica, into two compartments. As will be described in greater detail below, it is possible to engage the slide 21 with a condyle 10. With such engagement, the rotational movements of the lower jaw will occur through cooperation between the slide 21 and the condyle 10 while translational movements of the lower jaw will occur between as a result of relative motion between the slide 21 and the cranial joint track 16. Slide 21 passively follows the movement of the condyle 10 during translational movement and is thus displaceable with the latter along the path defined by guide grooves 20. Since the slide 21 and condyle 10 are, under the action of the resilient attachment devices 4, in frictional engagement, overload may cause the slide 21 and condyle 10 to become disengaged whereby the condyle 10 will directly engage the cranial joint track 16 and carry out rotational and sliding movement in the joint track.

In the disclosed embodiments, the slide 21 comprises a pair of spaced rods 22 which both engage the guide grooves 20 and define a pair of contact surfaces for a condyle 10. When in contact with the rods 22, a condyle 10 will be spaced from the cranial joint track 16. The spacing between the rods 22 is fixed by at least a first link or attachment 23 which is visible from the outside of the mandibular joint 3. Accordingly, the position of the slide 21, i.e., the replica of the meniscus, relative to the cranial joint track 16 will be readily apparent at all times.

Figure 3:
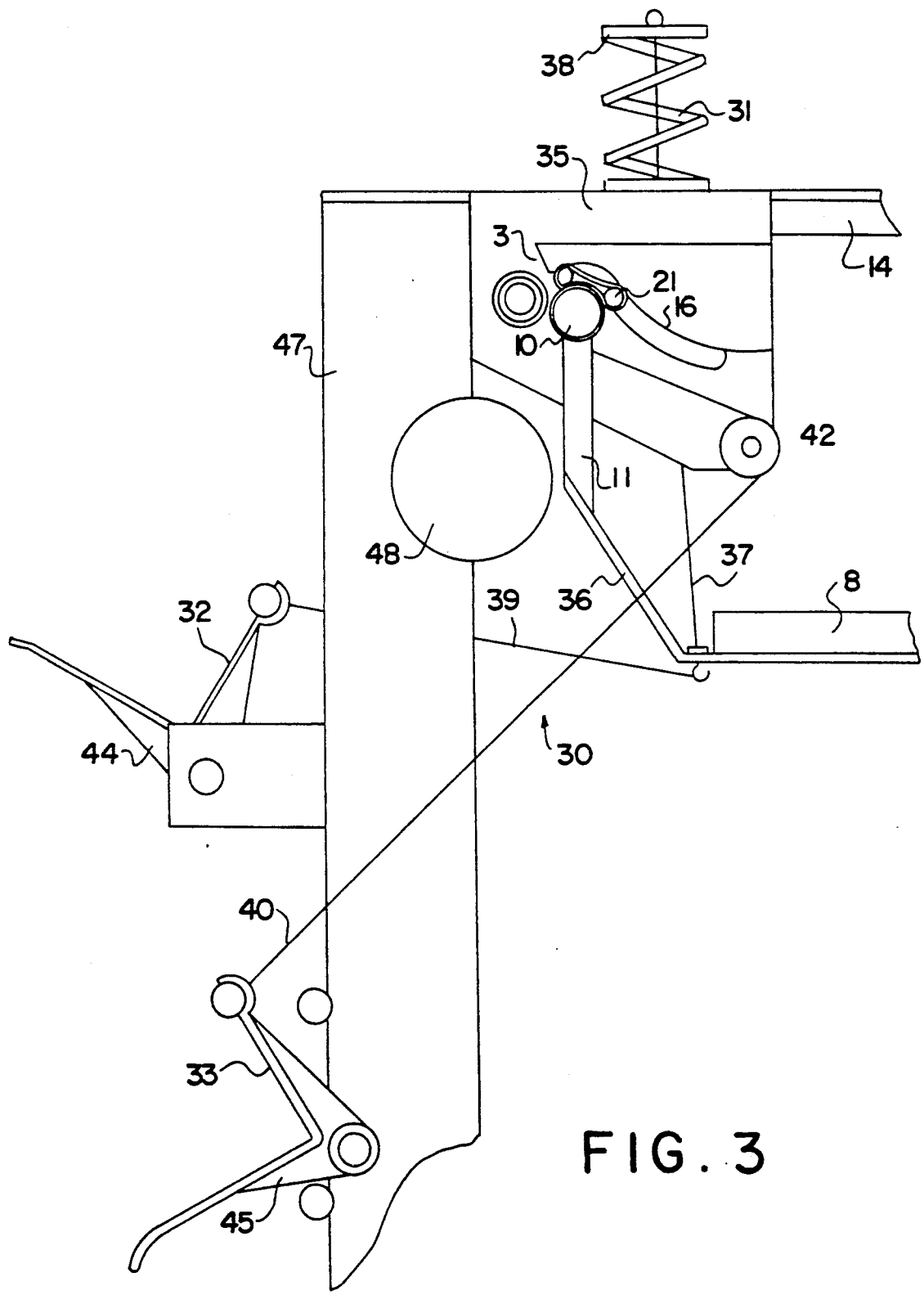
FIG. 3 is a partial side elevation view, on an enlarged scale, of an actuation device for imparting functional movements to a model in accordance with a second embodiment of the invention.
Figure 4:
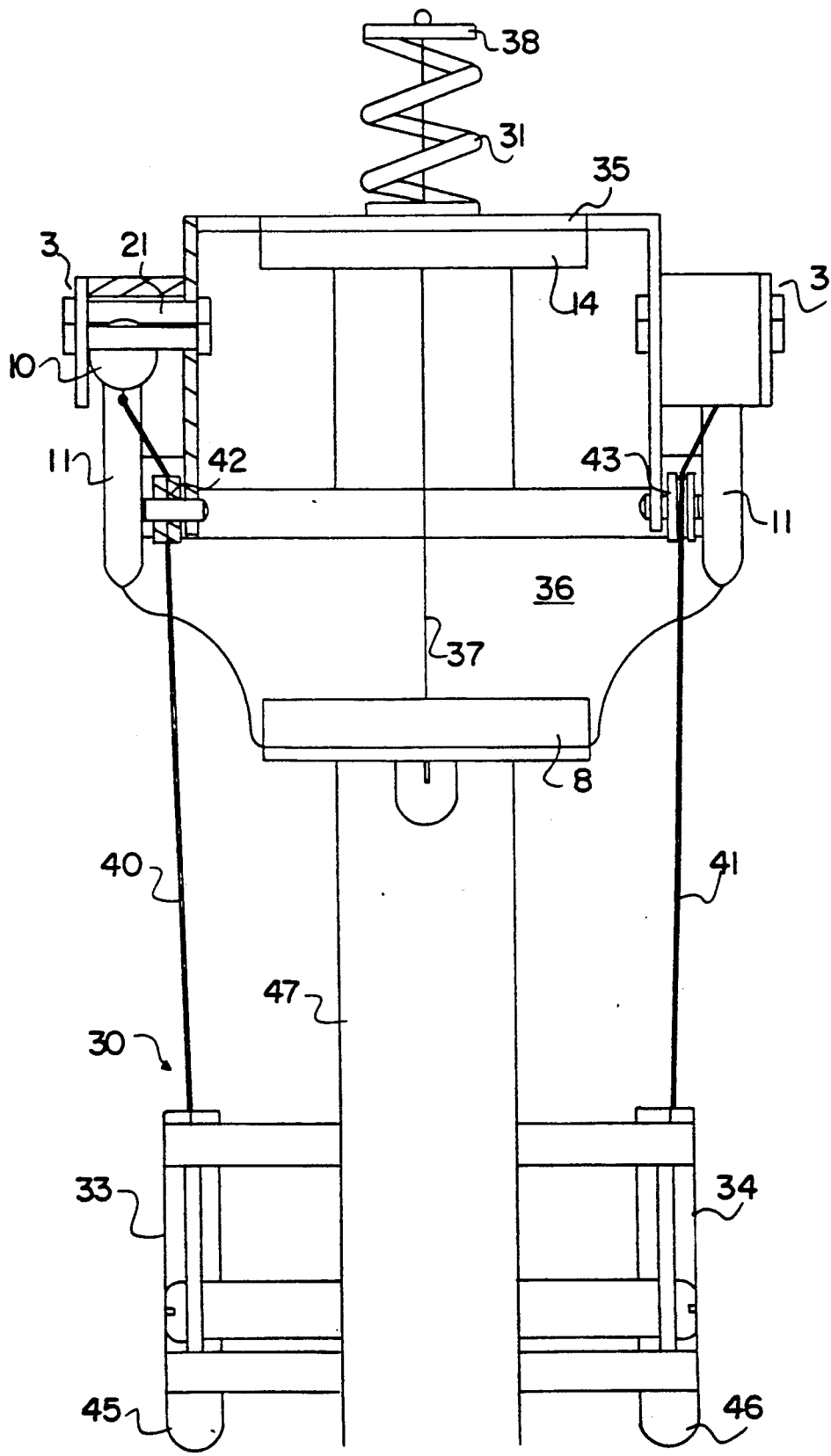
FIG. 4 is a front view of the apparatus shown in FIG. 3.

FIGS. 3 and 4 depict a second embodiment of the invention wherein a single actuation device, indicated generally at 30, is employed to produce the functional movements of the lower jaw. In order to facilitate understanding of the embodiment, the lower jaw bone 5 and cranial bone have been omitted from FIGS. 3 and 4. The model of the head of the embodiment of FIGS. 3 and 4 is essentially identical to the above-described embodiment with the exception that the elastic fixing devices 4 of the FIG. 1 embodiment are replaced by components of the actuation device 30. The actuation device 30 permits various force components to be controllably transmitted to a lower jaw member which is spring biased, by means of a single central spring 31, against the upper jaw and particularly in the direction of the primary base 14 of the magnetofix system mounted in the simulated skull. As will become obvious from the discussion below, the actuation device 30 makes it possible to carry out an opening movement, protrusive excursion and/or lateral displacement of the lower jaw. The actuation device 30 thus establishes an elastic connection of the lower jaw to the skull and this elastic connection simulates the human ligament system and the muscles of the lower jaw. The actuation device 30, in addition to the spring 31, comprises traction means 32, 33 and 34 for transmitting forces to impart a pivoting and/or sliding movement to the condyles 10 in the mandibular joints 3.

The primary base 14 of the receiver for the model of the row of teeth in the upper jaw and the exchangeable cranial joint track defining inserts 16 are fixed in the skull member by means of an upper jaw mounting piece 35. Mounting piece 35 defines a spacing between the cranial joint track defining inserts and the base 14. The primary base 8 of the magnetofix receiver system of the lower jaw is located on a lower jaw mounting piece 36 which can be fixed in the lower jaw. The necks 11, which support the condyles 10, are affixed to the lower jaw mounting piece 36. The condyles 10 may be brought into active engagement with the cranial joint tracks 16, or into contact with the rods 22 of the slides 21 when appropriate, as a result of the spring biasing of the lower jaw mounting piece 36 toward the upper jaw mounting piece 35. As noted, this resilient biasing is effected by means of a central spring 31. Spring 31 tensions a connecting device 37 which is fixed at one end to the lower jaw mounting piece 36. The connecting device 37 extends between a stop 38, which bears on spring 31, and the lower jaw mounting piece 36 as shown and thus the force developed by spring 31 tends to move the mounting piece 36 toward the mounting piece 35. The connecting device 37 can, for example, be in the form of a cord, wire, or cable and results in the generation of a force component on the mounting pieces which acts transversely to the plane of the primary base 14.

The above-described resiliently biased mounting pieces permits the models of a patient's dental arches, located respectively on the primary bases 8 and 14, to be held in the occlusal position. By using the traction means 32, 33 and 34, as will be described below, it is possible to move the lower jaw mounting piece 36 together with the model of the dental arch of the lower jaw out of the occlusal position in accordance with the degrees of freedom permitted by the simulated mandibular joints 3.

The traction means 32 is provided for causing a pivoting movement of the lower jaw mounting piece 36 regardless of the location of the condyles 10 along the cranial joint tracks 16. Traction means 32 engages, via a traction connection which is preferably in the form of a cable 39, the rear of the lower jaw mounting piece 36. The pivoting movement produced by the traction means 32 in a first or opening direction is limited by a stop 48. The limited pivoting motion, in conjunction with the above-described spring biasing, simulates the ligament and muscle system of the lower jaw for the opening movement.

Traction means 33 and 34, which can be actuated independently of one another, permit individual or combined displacement of the condyles 10 along their respective cranial joint tracks 16. The traction means 33 and 34 each engage, via a traction connection, a respective joint neck 11 or condyle 10. The traction connections of the traction means 33 and 34 are shown as comprising respective cables 40 and 41. The cables 40 and 41 pass over respective deflection rollers 42, 43 which direct a force component in a direction essentially parallel to the axial extension of the associated cranial joint track 16. This force component, in conjunction with the above-discussed spring biasing, simulates the ligament and muscle system of the lower jaw for lateral displacement, either left or right, and for protrusive excursion. Individual levers 44, 45, 46 are respectively provided for actuation of the traction means 32, 33 and 34. These levers can be rotatably fixed to a support 47 which is rigidly connected to the upper jaw mounting piece 35.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A model for use in the representation of gnathological relationships comprising:

a first member which simulates at least a part of a skull, said first member including an upper jaw portion, said first member also including a receiver for supporting a reproduction of a dental arch in said upper jaw portion;

a second member which simulates a lower jaw, said second member including a receiver for supporting a reproduction of a dental arch;

means forming a pair of spaced apart simulated mandibular joints whereby an articulated connection between said first and second members may be established, said joint forming means each including:

means defining a generally concave undulating cranial joint track, said track defining means being supported on said first member;

means defining a simulated condyle, said simulated condyle being generally complimentary in shape to said track profile, said simulated condyle being supported on said second member and being movable relative to said track; and slide means mounted on said track defining means for movement in synchronism with said condyle defining means when said simulated condyle moves relative to said track, said slide means in part being visible from the exterior of the model; and means for resiliently biasing said members toward one another whereby dental arches supported therein may assume an occlusal position.

2. The apparatus of claim 1 wherein said track defining means each further define a groove having a contour which follows the contour of the cranial joint track and wherein said slide means engages said groove.

3. The apparatus of claim 2 wherein said receivers of said first and second members removably support dental arches whereby the dental arches maybe exchangeable models of dental arches of a patient.

4. The apparatus of claim 3 wherein said receivers comprise Quicksplit magnetofix systems.

5. The apparatus of claim 1 wherein said track defining means includes a pair of spaced apart side pieces and a track surface defining member positioned therebetween, a groove being formed in each of said side pieces, said grooves being aligned and parallel, said grooves following the contour of said undulating joint track whereby said grooves define a motion path which is parallel to said joint track surface, said slide means engaging said grooves.

6. The apparatus of claim 5 wherein said slide means each include:

a pair of spaced rods which engage said groove, said rods being shaped and spaced to frictionally engage a said simulated condyle whereby the said simulated condyle may move along a path defined by said groove and parallel to said cranial joint track while being spaced from said track.

7. The apparatus of claim 5 wherein said slide means each include:

a pair of spaced rods which engage said grooves, said rods being shaped and spaced to frictionally engage a said simulated condyle whereby the said simulated condyle may move along a path defined by said grooves and parallel to said cranial joint track while being spaced from said track.

8. The apparatus of claim 7 wherein said receivers of said first and second members removably support dental arches whereby the dental arches may be exchangeable models of dental arches of a patient.

9. The apparatus of claim 7 wherein said biasing means comprises elastic means affixed to each side of said second member, said elastic means also being affixed to said first member.

10. The apparatus of claim 7 further comprising traction means for applying force to said second member whereby motion can be imparted to said simulated lower jaw to cause a dental arch reproduction supported therein to move from the said occlusal position.

11. The apparatus of claim 10 wherein said traction means includes:
   means for causing said simulated condyle to pivot relative to said joint track; and
   means for applying a force to each of said simulated condyles in a direction which is parallel to an axial extension of a cranial joint track.

12. The apparatus of claim 11 wherein said biasing means comprises elastic means affixed to each side of said second member, said elastic means also being affixed to said first member.

13. The apparatus of claim 12 wherein said receivers of said first and second members removably support dental arches whereby the dental arches may be exchangeable models of dental arches of a patient.

14. The apparatus of claim 13 wherein said elastic means comprises a pair or springs on each side of said second member.

15. The apparatus of claim 7 wherein said elastic means includes spring means generally disposed intermediate said simulated mandibular join forming means.

16. The apparatus of claim 1 wherein said biasing means comprises elastic means affixed to each side of said second member, said elastic means also being affixed to said first member.

17. The apparatus of claim 16 wherein said elastic means comprises a pair or springs on each side of said second member.

18. The apparatus of claim 1 wherein said elastic means includes spring means generally disposed intermediate said simulated mandibular joint forming means.

19. The apparatus of claim 1 further comprising traction means for applying force to said second member whereby motion can be imparted to said simulated lower jaw to cause a dental arch reproduction supported therein to move from the said occlusal position.

20. The apparatus of claim 19 wherein said traction means includes:
   means for causing said simulated condyle to pivot relative to said joint track; and
   means for applying a force to each of said simulated condyles in a direction which is parallel to an axial extension of a cranial joint track.

* * * * *

UNITED STATES PATENT AND TRADEMARK OFFICE
CERTIFICATE OF CORRECTION

PATENT NO. :  5,098,289
DATED      :  March 24, 1992
INVENTOR(S):  Tibor Feher

It is certified that error appears in the above-identified patent and that said Letters Patent is hereby corrected as shown below:

In column 6, line 51, change "5" to --1--.

In column 8, line 2, change "or" to --of--;
              line 6, change "join" to --joint--.

Signed and Sealed this

Fifth Day of April, 1994

Attest:

BRUCE LEHMAN

*Attesting Officer*          Commissioner of Patents and Trademarks